Feb. 2, 1926.
S. G. DOWN
1,571,245
MOTOR VEHICLE BRAKE
Filed March 11, 1924
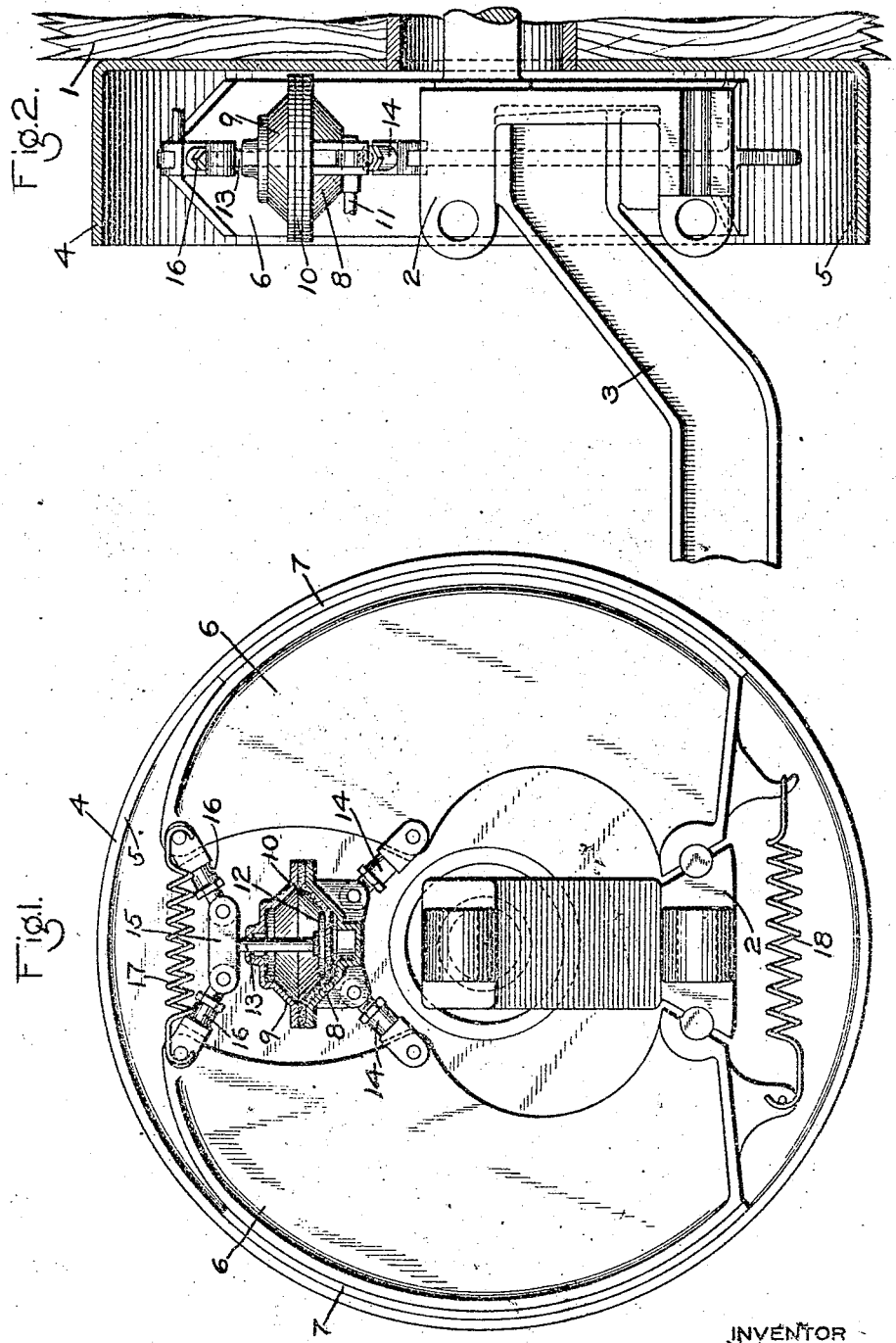
INVENTOR
SIDNEY G. DOWN
BY Wm. M. Cady
ATTORNEY Patented Feb. 2, 1926.

1,571,245

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MOTOR-VEHICLE BRAKE.

Application filed March 11, 1924. Serial No. 698,508.

*To all whom it may concern:*

Be it known that I, SIDNEY G. DOWN, a citizen of the United States, residing at Pittsburgh, in the county of Allegheny and State of Pennsylvania, have invented new and useful Improvements in Motor-Vehicle Brakes, of which the following is a specification.

This invention relates to brakes, and more particularly to a fluid pressure front wheel brake adapted for motor vehicles.

The principal object of my invention is to provide an improved front wheel brake of the above type.

In the accompanying drawing; Fig. 1 is a side elevation of a front wheel brake construction embodying my invention; and Fig. 2 a central sectional view of the construction shown in Fig. 1.

In the drawing, the reference numeral 1 indicates a front wheel of a motor vehicle which is supported by the usual steering knuckle 2, carried by the front axle 3. Secured to the wheel 1 is a brake drum 4 having an integral friction face 5 and mounted in said drum are brake heads 6, having brake shoes 7 adapted to engage the friction face 5 of the drum.

According to my invention, a brake chamber is provided comprising a flanged casing 8 and a flanged cover plate 9 which are secured together to form the brake chamber with a flexible diaphragm 10 clamped between the flanges of the casing and the cover plate.

The chamber at one side of the diaphragm 10 is open to a pipe 11, through which fluid under pressure is supplied to and released from the diaphragm. A pressure plate 12 engages the opposite side of the diaphragm 10 and secured to said plate is a push rod 13.

The casing 8 is pivotally connected to a pair of links 14, which are pivotally connected to the free ends of the brake heads 6. Connected to the rod 13 is a crosshead 15 and pivotally connected to said link is a pair of links 16 which are also pivotally connected to the free ends of the brake heads 6.

When fluid under pressure is supplied through pipe 11 to the diaphragm 10, said diaphragm is moved outwardly relatively to the casing 8. A relative movement between the casing 8 and the push rod 13 then takes place, so that the links 16 are operated by the movement of the push rod 13 while the links 14 are operated by the reactive movement of the casing 8, to effect a spreading of the ends of the brake heads 6. The spreading of the ends of the brake heads causes the brake shoes 7 to engage the friction face 5 of the brake drum 4 and thus an application of the brakes is effected.

When fluid is released through pipe 11 from the diaphragm 10, the springs 17 and 18 connected to the brake heads 6, operate to effect the movement of the brake heads to release position.

With the above described construction, the brake chamber is supported in position solely by its operating connections to the brake heads and that the brake chamber is contained within the brake drum so that a very compact construction is provided.

Having now described my invention, what I claim as new and desire to secure by Letters Patent, is:—

In a vehicle brake, the combination with a brake drum and brake heads mounted in said drum, of a fluid pressure brake chamber comprising a casing, links connecting said casing to said brake heads, a movable abutment in said brake chamber, a push rod operable by said abutment, and links operatively connecting said push rod to said brake heads.

In testimony whereof I have hereunto set my hand.

SIDNEY G. DOWN.